US012780060B2

(12) United States Patent
Kang et al.

(10) Patent No.: US 12,780,060 B2
(45) Date of Patent: Nov. 3, 2026

(54) SEAT FOR VEHICLE

(71) Applicant: Hyundai Transys Inc., Seosan-si (KR)

(72) Inventors: Sin Jeong Kang, Hwaseong-si (KR); Han Kyung Park, Hwaseong-si (KR); Jae Hoon Cho, Hwaseong-si (KR); Won Young Lee, Hwaseong-si (KR); Hae Dong Kwak, Hwaseong-si (KR); Hyeon Jae Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 120 days.

(21) Appl. No.: 18/825,365

(22) Filed: Sep. 5, 2024

(65) Prior Publication Data

US 2025/0083580 A1 Mar. 13, 2025

(30) Foreign Application Priority Data

Sep. 12, 2023 (KR) ........................ 10-2023-0121167

(51) Int. Cl.
*B60N 2/30* (2006.01)
*A47C 1/121* (2006.01)

(52) U.S. Cl.
CPC .............. *B60N 2/304* (2013.01); *A47C 1/121* (2013.01); *B60N 2/3004* (2013.01); *B60N 2/3088* (2013.01)

(58) Field of Classification Search
CPC ...... B60N 2/304; B60N 2/3047; B60N 2/305; A47C 1/121
See application file for complete search history.

(56) References Cited

U.S. PATENT DOCUMENTS

| | | | | |
|---|---|---|---|---|
| 8,376,442 | B1 * | 2/2013 | Brantley | B60N 2/24 296/65.09 |
| 9,873,354 | B2 * | 1/2018 | Poulos | B60N 2/062 |
| 11,135,947 | B2 * | 10/2021 | Merchant | B60N 2/3047 |
| 11,890,975 | B2 * | 2/2024 | Shin | B60N 2/3011 |
| 12,128,798 | B2 * | 10/2024 | Yun | B60N 2/3031 |
| 12,269,372 | B2 * | 4/2025 | You | B60N 2/3045 |
| 2006/0267390 | A1 * | 11/2006 | Epaud | B60N 2/3013 297/313 |
| 2013/0093218 | A1 * | 4/2013 | Yetukuri | B60N 2/859 297/311 |

(Continued)

FOREIGN PATENT DOCUMENTS

| | | | | |
|---|---|---|---|---|
| CN | 120517290 A * | 8/2025 | | B60N 2/919 |
| KR | 20-2014-0000097 U | 1/2014 | | |

(Continued)

*Primary Examiner* — Timothy J Brindley
(74) *Attorney, Agent, or Firm* — Bridgeway IP Law Group, PLLC; Jihun Kim

(57) ABSTRACT

A vehicle seat includes a fixed frame installed in a vehicle body, a rotating link connected to the fixed frame through a rotation shaft and rotating relative to the rotation shaft, a seat cushion frame having one side of a rear end portion hinge-connected to the rotating link at a first connection point to rotate the rotating link when rotating, and a seat back frame having one side of a lower end portion hinge-connected to the fixed frame at a second connection point and the other side of the lower end portion hinge-connected to the other side of the rear end portion of the seat cushion frame at a third connection point to rotate relative to the fixed frame when the seat cushion frame is rotated.

17 Claims, 8 Drawing Sheets

(56) References Cited

U.S. PATENT DOCUMENTS

| | | | | |
|---|---|---|---|---|
| 2017/0088020 | A1* | 3/2017 | Poniatowski .......... | B60N 2/305 |
| 2020/0262315 | A1 | 8/2020 | Gropp et al. | |
| 2022/0227268 | A1* | 7/2022 | Gam .................... | B60N 2/3093 |
| 2025/0269773 | A1* | 8/2025 | Kim ..................... | B60N 2/3047 |
| 2026/0001454 | A1* | 1/2026 | Ziolek .................... | B60N 2/206 |

FOREIGN PATENT DOCUMENTS

| | | | | | |
|---|---|---|---|---|---|
| KR | 10-2410521 | B1 | | 6/2022 | |
| KR | 10-2022-0162513 | A | | 12/2022 | |
| KR | 10-2023-0079548 | A | | 6/2023 | |
| KR | 20250130113 | A | * | 9/2025 | ............. B60N 2/919 |
| KR | 20250137499 | A | * | 9/2025 | ............. B60N 2/309 |
| WO | 2009/072321 | A1 | | 6/2009 | |
| WO | WO-2012160341 | A2 | * | 11/2012 | ............... B60N 2/24 |
| WO | WO-2019048396 | A1 | * | 3/2019 | ............. B60R 7/043 |

* cited by examiner

SEAT FOR VEHICLE

CROSS-REFERENCE TO RELATED APPLICATION

The present application claims priority to Korean Patent Application No. 10-2023-0121167 filed Sep. 12, 2023, the entire contents of which is incorporated herein for all purposes by this reference.

BACKGROUND OF THE INVENTION

Field of the Invention

The present disclosure relates to vehicle seats that are configured to implement various modes with a relatively simple configuration, are very light in weight and applicable to various vehicle models, and are configured to implement various modes with a single lever.

Description of the Related Art

Capacity to implement various modes and ensure safety is required of the seats mounted in vehicles. There is an increasing demand for various modes of vehicle seats, such as a reclining function that rotates the seat back, a tilting function that tilts the cushion accordingly, a relax mode where the seat back reclines and the cushion tilts, and the like In addition, as autonomous driving of vehicles becomes possible, the relax mode has become indispensable. This is especially true when it comes to multi-purpose vehicles, where the development of a stow mode in which seats are folded and stowed away to use the vehicle cabin space for other purposes is desired.

Demands for various modes in vehicle seats are increasing, and seat configurations are becoming more complex and require a large number of actuators accordingly.

However, if the conventional seat structure remains unchanged, installation of multiple actuators, frames, and switches results in heavy, expensive, and difficult-to-operate seats that are bulky and difficult to install and remove.

Therefore, a new compact seat structure was required to address these issues.

The matters described above as background technology are only for a better understanding of the background of the present disclosure and should not be construed as acknowledging that the present disclosure falls into the conventional technology already widely known to those skilled in the art.

SUMMARY OF THE INVENTION

The present disclosure is proposed to address the issues described above. An object of the present disclosure is to provide a vehicle seat that are configured to implement various modes in a relatively simple configuration, are very light in weight and applicable to diverse vehicle models, and are configured to implement various modes with a single lever.

The vehicle seat according to the present disclosure to achieve the object described above includes a fixed frame installed in a vehicle body; a rotating link connected to the fixed frame through a rotation shaft and rotating relative to the rotation shaft; a seat cushion frame having one side of the rear end portion hinge-connected to the rotating link at a first connection point to rotate the rotating link when rotating; and a seat back frame having one side of the lower end portion hinge-connected to the fixed frame at a second connection point and the other side of the lower end portion hinge-connected to the other side of the rear end portion of the seat cushion frame at a third connection point to rotate relative to the fixed frame when the seat cushion frame is rotated.

The fixed frame may have a rotation shaft formed in the front portion and have an upper portion hinge-connected to the seat back frame.

A recliner may be provided on the rotation shaft, and the recliner may have one side connected to the fixed frame and the other side connected to the rotating link.

A lever may be provided in the recliner, and the rotation of the rotating link may be allowed or restricted by the movement of the lever.

The lower part of the rear end portion of the seat cushion frame may be hinge-connected to the rotating link and the upper part of the rear end portion may be hinge-connected to the seat back frame.

An elastic mechanism may be provided between the fixed frame and the rotating link, and the elastic mechanism may apply a rotational force to the rotating link in the direction in which the seat cushion frame is erected upwards.

The elastic mechanism may be a spring disposed on the rotation shaft and having two ends respectively connected to the fixed frame and the rotating link.

An elastic mechanism is provided between the fixed frame and the seatback frame, and the elastic mechanism may apply a rotational force in the direction in which the seatback frame is erected upright.

The elastic mechanism may connect a first point of the fixed frame and a second point of the seatback frame and may apply an elastic force in the direction in which the first point and the second point are brought closer together.

When the seat cushion frame is lowered forward, the seat back frame stands upward to form a default position. When the seat cushion frame is diagonally rotated between the forward and upward directions, the seat back frame diagonally rotates between rearward and upward directions to form a relax position. When the seat cushion frame is pulled upright, the seat back frame is erected upright to form a stow position.

The first connection point may be positioned behind the rotation shaft in the default position.

The first connection point may be positioned behind an imaginary line connecting the rotation shaft and the second connection point and an imaginary line connecting the rotation shaft and the third connection point in the default position.

The first connection point may be positioned above the rotation shaft in the relax position.

The first connection point may be positioned between the imaginary line connecting the rotation shaft and the second connection point and the imaginary line connecting the rotation shaft and the third connection point in the relax position.

The first connection point may be positioned in front of the rotation shaft in the stow position.

The first connection point may be positioned in front of the imaginary line connecting the rotation shaft and the second connection point and the imaginary line connecting the rotation shaft and the third connection point in the stow position.

According to the vehicle seat of the present disclosure, various modes may be implemented in a relatively simple configuration. The seat is very lightweight and applicable to diverse vehicle models and allows the implementation of various modes with just one lever.

DETAILED DESCRIPTION OF THE INVENTION

Figure 1:
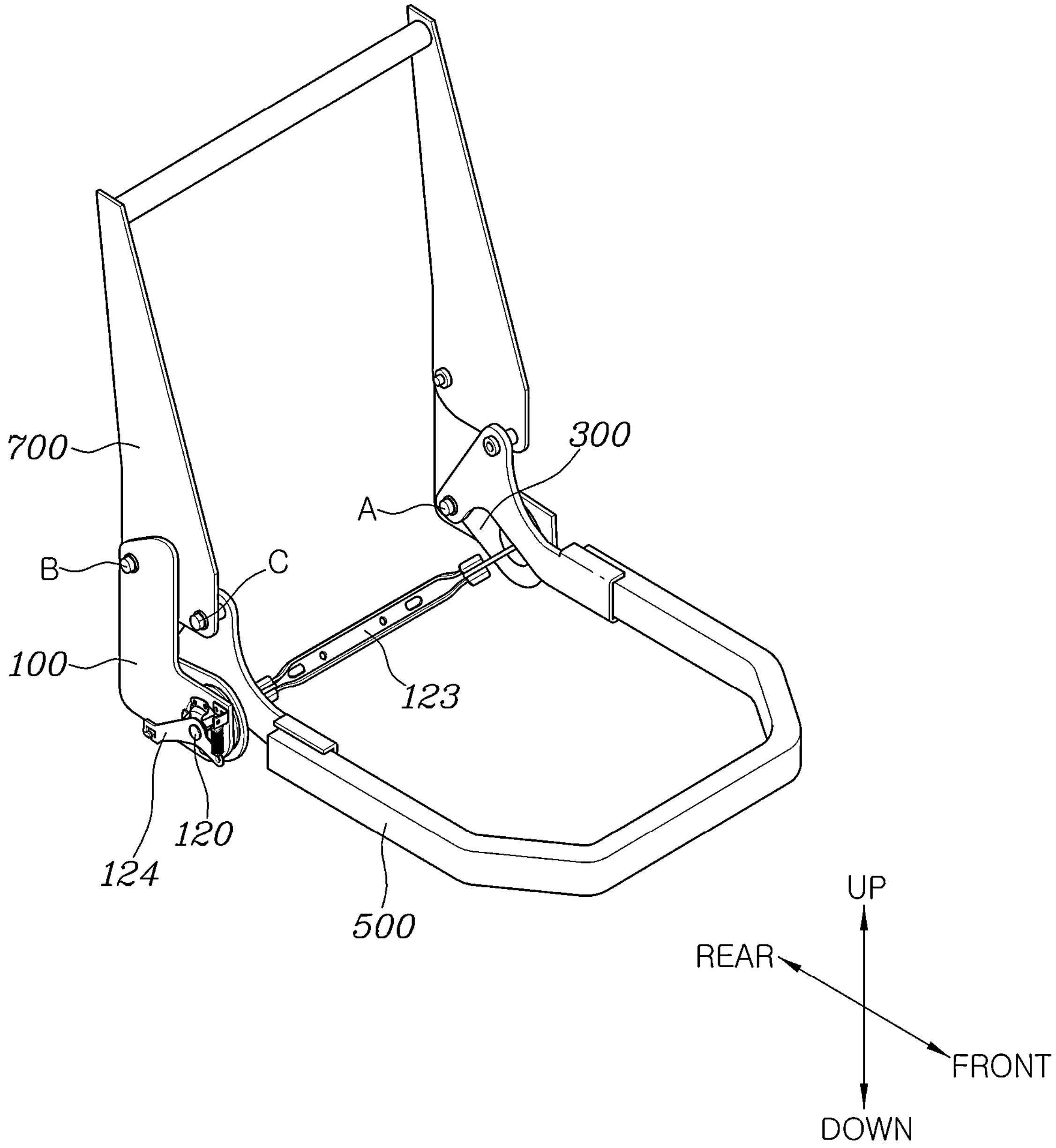
FIG. 1 is a perspective view of a vehicle seat according to an embodiment of the present disclosure.

Hereinafter, embodiments disclosed in the present disclosure will be described in detail with reference to the accompanying drawings. The same reference numerals will be assigned to the similar or same components regardless of drawing numbers and repetitive descriptions will be omitted.

When it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

Singular expressions include plural expressions unless the context explicitly indicates otherwise.

In the present specification, terms such as “comprise” or “have” are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

The suffixes “module” and “unit” for the components used in the following description are given or interchangeably used only to facilitate the writing of the specification, without necessarily indicating a distinct meaning or role of their own.

It is to be understood that when a component is referred to as being “connected” or “coupled” to another component, the component may be directly connected or coupled to the another component, but other components may be interposed therebetween. In contrast, it is to be understood that no other component is interposed when a component is referred to as being “directly connected” or “directly coupled” to another component.

Figure 2:
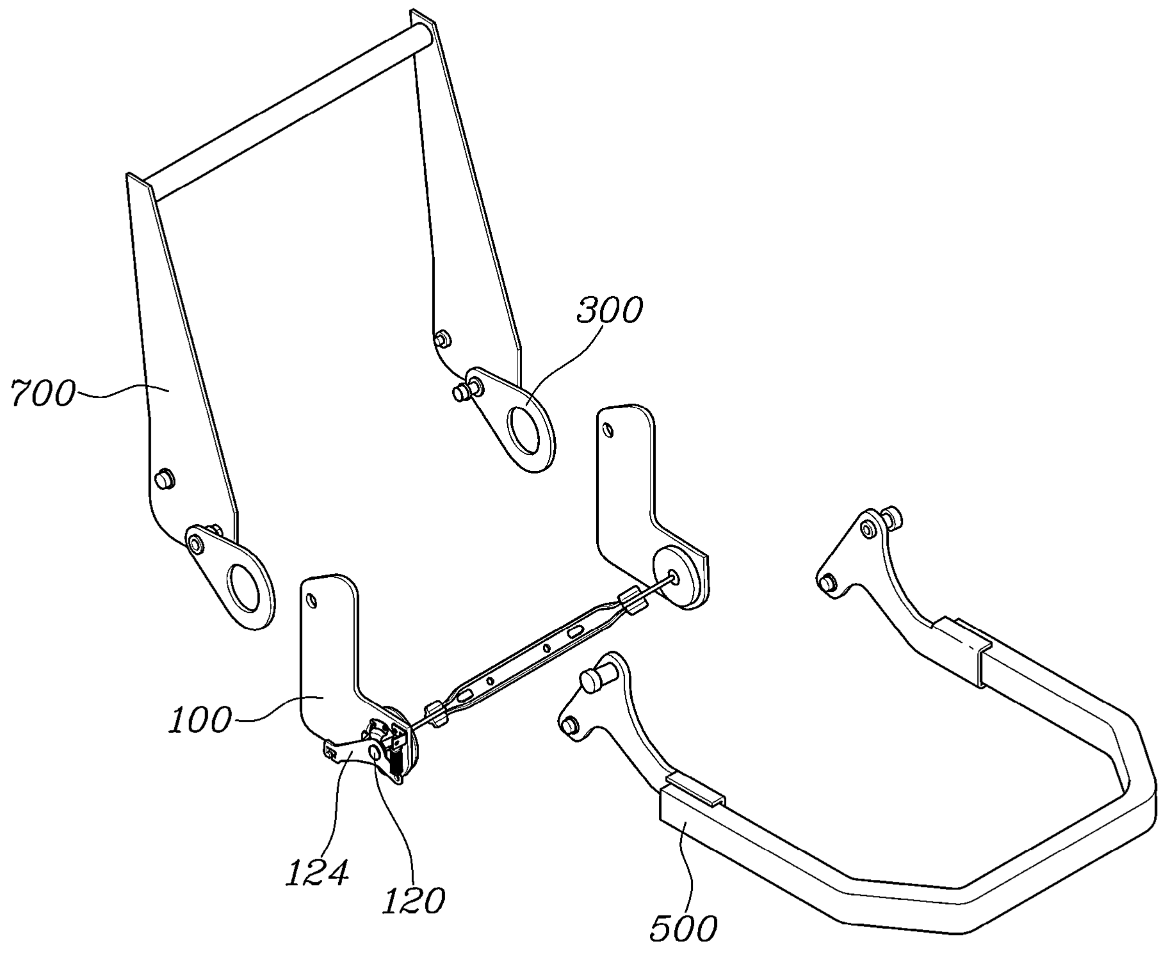
FIG. 2 is an exploded perspective view of a vehicle seat according to an embodiment of the present disclosure.
Figure 3:
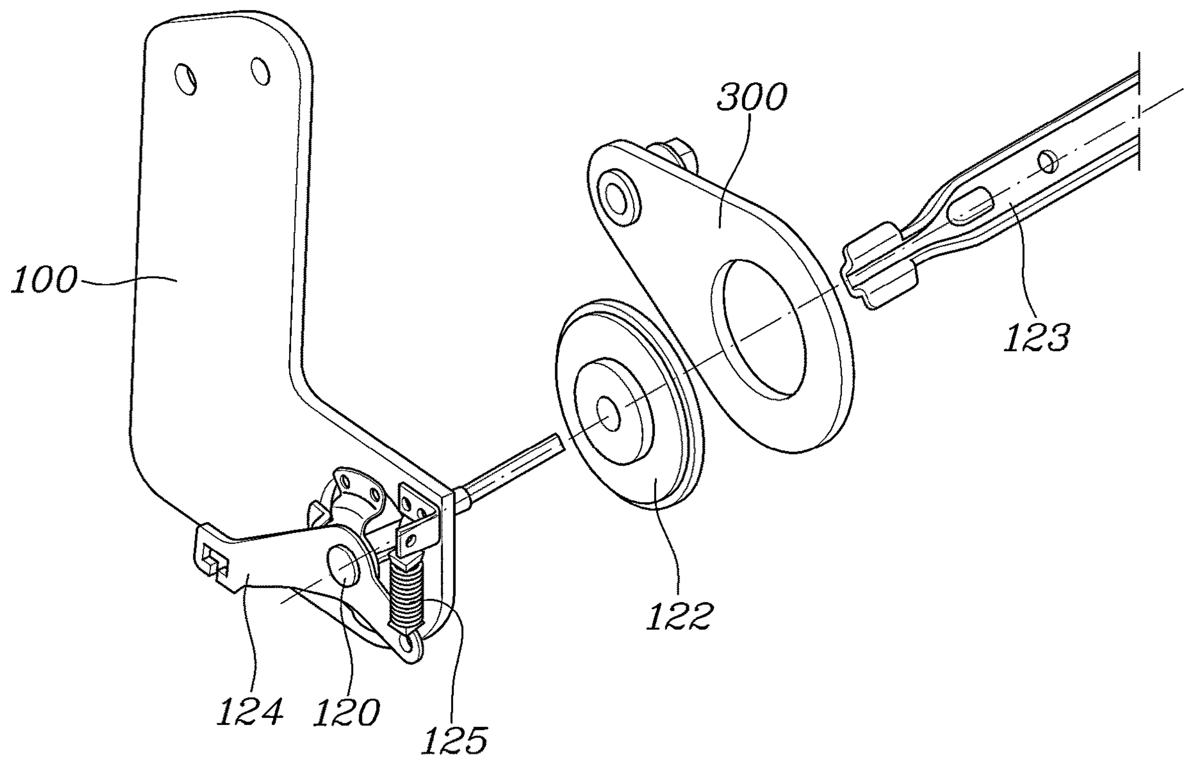
FIG. 3 is an enlarged view of a fixed frame of a vehicle seat according to an embodiment of the present disclosure.
Figure 4:
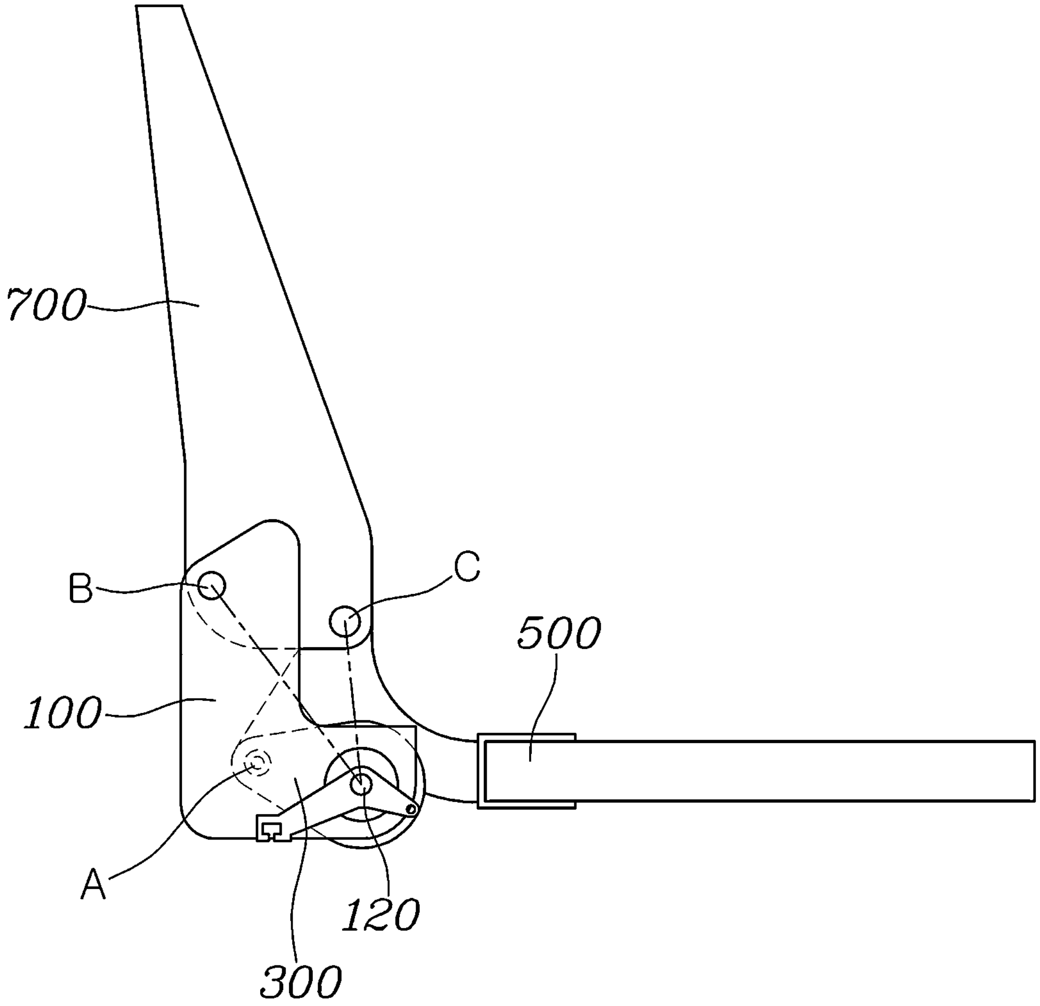
FIG. 4 is a view illustrating a default position of a vehicle seat according to an embodiment of the present disclosure.
Figure 5:
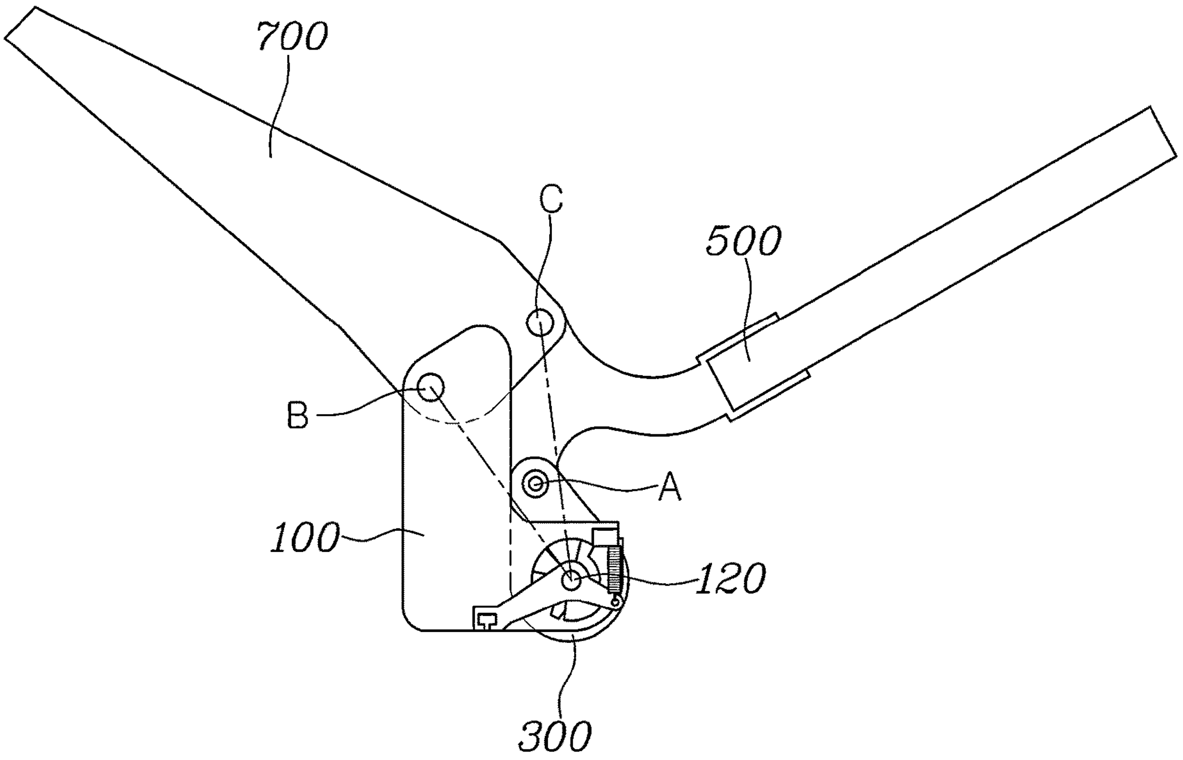
FIG. 5 is a view illustrating a relax position of a vehicle seat according to an embodiment of the present disclosure.
Figure 6:
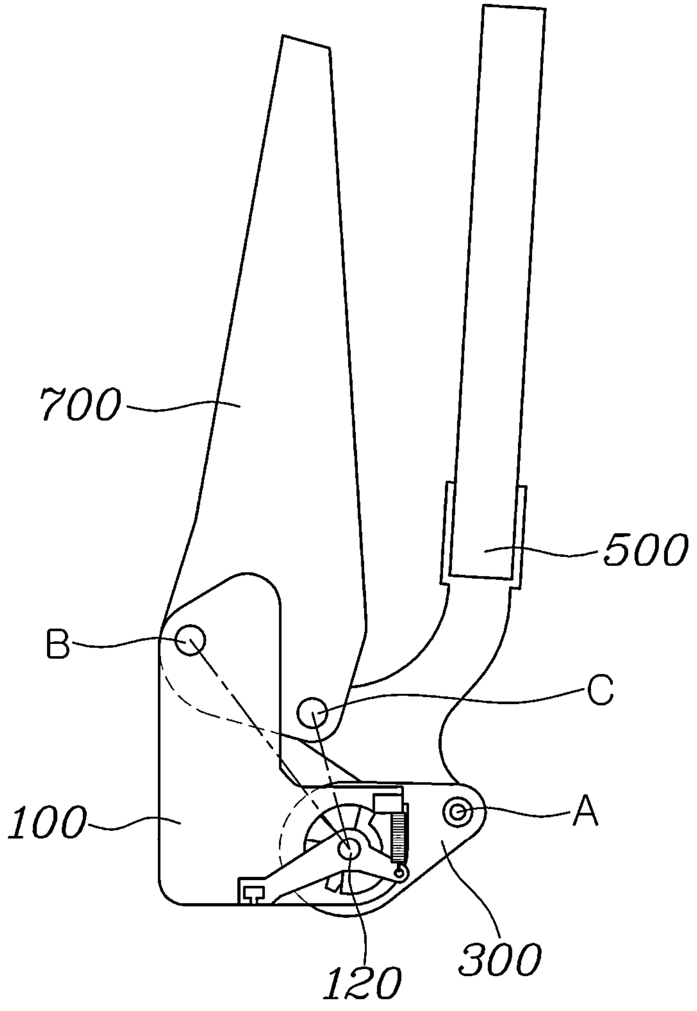
FIG. 6 is a view illustrating a stow position of a vehicle seat according to an embodiment of the present disclosure.
Figure 7:
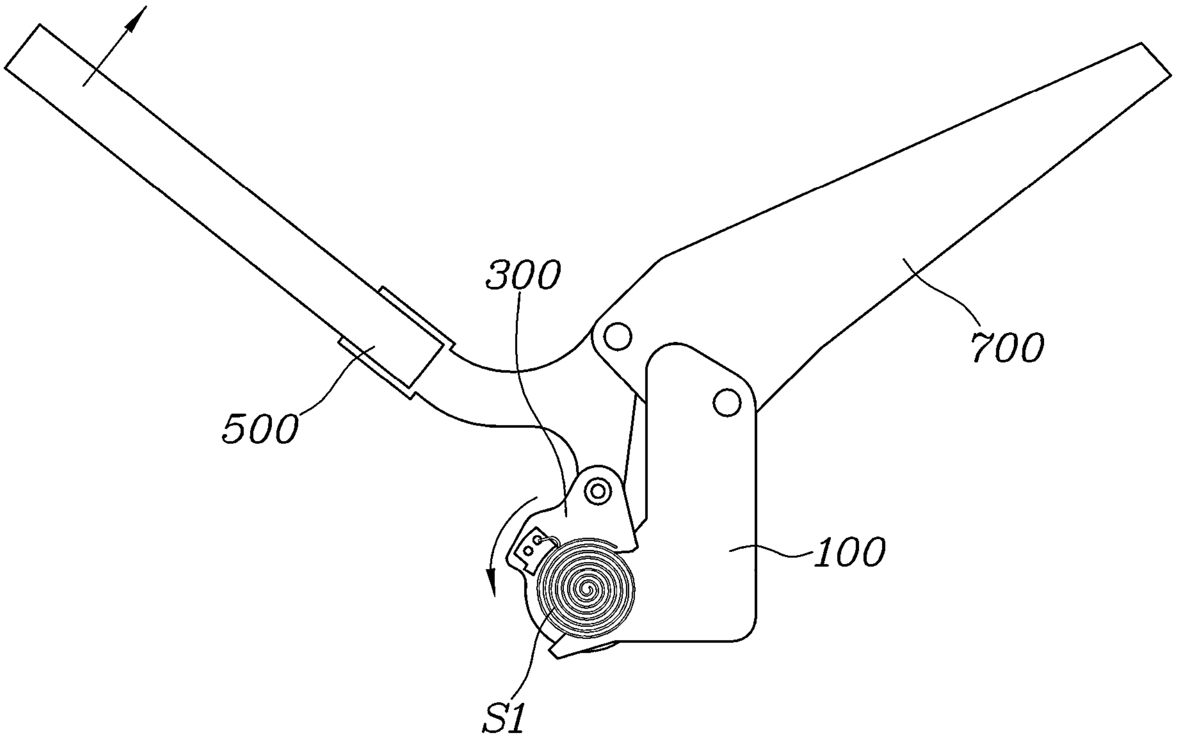
FIGS. 7 and 8 are views illustrating an elastic mechanism of a vehicle seat according to an embodiment of the present disclosure.
Figure 8:
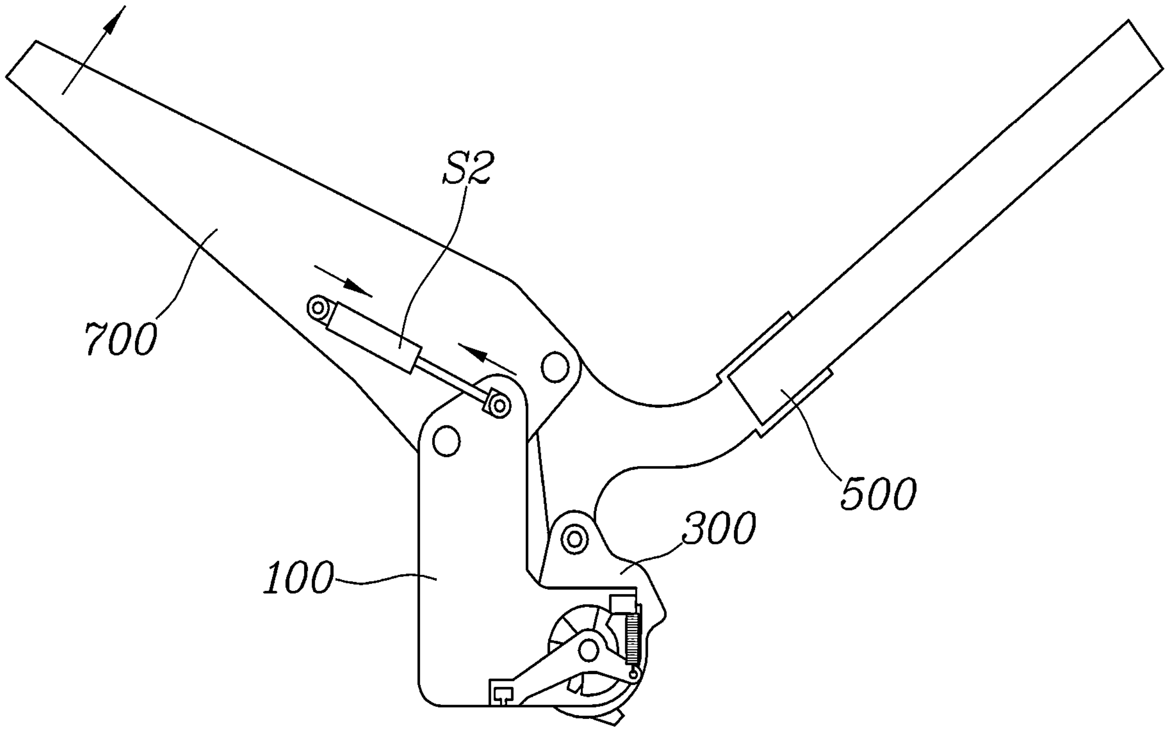

FIG. 1 is a perspective view of a vehicle seat according to an embodiment of the present disclosure, FIG. 2 is an exploded perspective view of a vehicle seat according to an embodiment of the present disclosure, FIG. 3 is an enlarged view of a fixed frame of a vehicle seat according to an embodiment of the present disclosure, FIG. 4 is a view illustrating a default position of a vehicle seat according to an embodiment of the present disclosure, FIG. 5 is a view illustrating a relax position of a vehicle seat according to an embodiment of the present disclosure, FIG. 6 is a view illustrating a stow position of a vehicle seat according to an embodiment of the present disclosure, and FIGS. 7 and 8 are view illustrating an elastic mechanism of a vehicle seat according to an embodiment of the present disclosure.

First, FIG. 1 is a perspective view of a vehicle seat according to an embodiment of the present disclosure, FIG. 2 is an exploded perspective view of a vehicle seat according to an embodiment of the present disclosure, and FIG. 3 is an enlarged view of a fixed frame of a vehicle seat according to an embodiment of the present disclosure.

A vehicle seat according to the present disclosure includes a fixed frame 100 installed in the vehicle body; a rotating link 300 connected to the fixed frame 100 through a rotation shaft 120 and rotating relative to the rotation shaft 120, a seat cushion frame 500 having one side of the rear end portion hinge-connected to the rotating link 300 at a first connection point A to rotate the rotating link 300 when rotating; and a seat back frame 700 having one side of the lower end portion hinge-connected to the fixed frame 100 at a second connection point B and the other side of the lower end portion hinge-connected to the other side of the rear end portion of the seat cushion frame 500 at a third connection point C to rotate relative to the fixed frame 100 when the seat cushion frame 500 is rotated.

The seat of the present disclosure includes the seat back frame 700 and the seat cushion frame 500 like a conventional seat. However, the difference is that the seat back frame and the seat cushion frame are directly connected through a rotation shaft and a recliner in the conventional seat while the connection is made indirectly through the rotating link 300 and the fixed frame 100 in the vehicle seat of the present disclosure.

The fixed frame 100 rather than the seat cushion frame 500 is installed on the vehicle body side in the seat of the present disclosure. The fixed frame 100 is connected to the vehicle body, and specifically, may be installed on the vehicle floor. The fixed frame 100 may be mounted such that its position is fixed in the vehicle body, or it may be variously installed to be slidable along a rail or rotatable (swivelable) by a rotation mechanism. However, it can be said that the fixed frame 100 is the only one that is directly connected to the vehicle body.

The rotating link 300 is connected to the fixed frame 100 through the rotation shaft 120. Since the rotating link 300 always rotates when various modes including a reclining mode is implemented, the rotating link 300 is connected to the fixed frame 100 through the recliner 122. The rotating link 300 is connected to the fixed frame 100 through the rotation shaft 120, and the rotation shaft 120 may be in the shape of a shaft and the shafts on both sides may be connected through a pipe 123. The recliner 122 may be provided in the rotation shaft 120 to connect the fixed frame 100 and the rotating link 300. In other words, the recliner 122 may be provided in the rotation shaft 120, with one side of the recliner 122 connected to the fixed frame 100 and the other side connected to the rotating link 300. Therefore, the rotating link 300 rotates relative to the rotation shaft 120, and the position of the rotation shaft 120 may be considered fixed to the fixed frame 100. A lever 124 may be connected to the recliner 122 in a state of being caught by a spring 125 such that the rotation of the rotating link 300 is allowed or restricted by the movement of the lever 124.

The seat cushion frame 500 which may form the passenger's seating surface has one side of its rear end portion hinge-connected to the rotating link 300 at the first connection point A. In other words, the seat cushion frame 500 is not directly connected to the recliner 122 but is connected to the rotating link 300 through the first connection point A. At the first connection point A, the seat cushion frame 500 is connected to the rotating link 300 through a pin or the like, which serves as a hinge pin.

The seat cushion frame 500 is rotated by the user pulling it up or pushing it down with a hand. In this case, the rotating link 300 also rotates by the movement of the seat cushion frame 500. In other words, the seat cushion frame 500 and the rotating link 300 are connected at the first connection point A so that they rotate relative to each other while the rotating link 300 also rotates relative to the fixed frame 100 through the rotation shaft 120 at the same time.

The seat back frame 700 has one side of its rear end portion hinge-connected to the fixed frame 100 at the second connection point B and the other side of the rear end portion hinge-connected to the other side of the rear end portion of the seat cushion frame 500 at the third connection point C. When the seat cushion frame 500 is rotated, the seat back frame 700 rotates relative to the fixed frame 100 through this connection arrangement.

In other words, when the user rotates the seat cushion frame 500 by hand, this causes the rotating link 300 to rotate, which in turn causes the seat back frame 700 to rotate relative to the fixed frame 100. This rotational relationship may be implemented manually. Alternatively, automatic rotation may also be implemented by installing a motor or actuator on the rotation shaft 120 or similar components.

The seat cushion frame 500 and the seat back frame 700 in the seat of the present disclosure are indirectly connected rather than directly connected and the connection is made through the rotating link 300 and the fixed frame 100 so that the default position, relax position, and stow position may all be implemented.

Specifically, the fixed frame 100 may have a rotation shaft formed at its front portion and an upper portion hinge-connected to the seat back frame 700. The fixed frame 100 may have a forward-extending shape and an upward-extending shape, as illustrated, and the rotation shaft 120 is formed in the front portion. The fixed frame 100 is connected to the rotating link 300 through the rotation shaft 120. In addition, the first connection point A of the rotating link 300 is formed at a point away from the rotation shaft 120 so that when the rotating link 300 rotates around the rotation shaft 120, the first connection point A also performs circular motion at a distant point, acting like a cam.

The upward-extending upper portion of the fixed frame 100 is hinge-connected to the seat back frame 700 to form the second connection point B.

In addition, the seat cushion frame 500 extends rearward, extending through a separate bracket or may extend in an integrated structure. The rear end portion of the seat cushion frame 500 extending rearward may split into two portions. The lower portion of the two split portions may be hinge-connected to the rotating link 300 to form the first connection point A and the upper portion may be hinge-connected to the seat back frame 700 to form the third connection point C.

Positions that the seat of the present disclosure can implement through the connection arrangement will be respectively described below.

FIG. 4 is a view illustrating a default position of a vehicle seat according to an embodiment of the present disclosure, FIG. 5 is a view illustrating a relax position of a vehicle seat according to an embodiment of the present disclosure, and FIG. 6 is a view illustrating a stow position of a vehicle seat according to an embodiment of the present disclosure.

FIG. 4 is a view illustrating the default position of a vehicle seat according to the present disclosure. The default position is the most basic position. In this case, the seat cushion frame 500 lies substantially parallel to the vehicle floor while the seat back frame 700 stands upright. In other words, when the seat cushion frame 500 is lowered forward, the seat back frame 700 remains upright to form the default position.

The first connection point A may be positioned behind the rotation shaft 120 in the default position. In other words, the seat cushion frame 500 lies down such that the rear lower end of the seat cushion frame 500 is positioned downward. Consequently, the first connection point A can only be positioned behind the rotation shaft 120. The seat back frame 700 remains upright due to the arrangement of other connection points.

In addition, on the other hand, the first connection point A may be positioned behind the imaginary line connecting the rotation shaft 120 and the second connection point B and the imaginary line connecting the rotation shaft 120 and the third connection point C in the default position. In other words, the second connection point B and the third connection point C are positioned relatively higher through the arrangement of these connection points, causing the seat back frame 700 to be upright.

FIG. 5 is a view illustrating the relax position of a vehicle seat according to an embodiment of the present disclosure. When the seat cushion frame 500 is diagonally rotated between forward and upward directions, the seat back frame 700 diagonally rotates between rearward and upward directions to form a relax position.

The first connection point A may be positioned above the rotation shaft 120 in the relax position. In this state, the seat cushion frame 500 is pulled up and rotated from the default position, causing the first connection point A to move forward, and the first connection point A moves forward and upward due to the rotation of the rotating link 300. Consequently, the first connection point A is positioned above the rotation shaft 120. In addition, as the seat cushion frame 500 is rotated, the third connection point C also moves upward.

Alternatively, the first connection point A may be described as being positioned between the imaginary line connecting the rotation shaft 120 and the second connection point B and the imaginary line connecting the rotation shaft 120 and the third connection point C. in the relax position. As the seat cushion frame 500 is rotated counterclockwise and pulled up from the default position according to the drawing, the seat back frame 700 also rotates counterclockwise to recline, with the front of the lower end portion, i.e., the third connection point C, being lifted. Consequently, the relax position is achieved as illustrated in FIG. 5.

When the seat cushion frame 500 is further rotated counterclockwise from this state, the stow position is achieved.

FIG. 6 is a view illustrating the stow position of a vehicle seat according to an embodiment of the present disclosure. When the seat cushion frame 500 is further pulled upright from the relax position, the seat back frame 700 rotates clockwise in reverse to be erected upright and the stow position may be achieved.

The first connection point A may be positioned in front of the rotation shaft 120 in the stow position. In addition, the first connection point A may be positioned in front of the imaginary line connecting the rotation shaft 120 and the second connection point B and the imaginary line connecting the rotation shaft 120 and the third connection point C in the stow position.

In this case, as the seat cushion frame 500 is further pulled upright from the relax position in FIG. 5, the third connection point C moves rearward to erect the seat back frame 700 in reverse. Both the seat cushion frame 500 and the seat back frame 700 are erected upright into a stowed state that takes up the least space.

In this state, the first connection point A is positioned at the most forward point. Consequently, the first connection point A may be positioned in front of the imaginary line connecting the rotation shaft 120 and the second connection point B and the imaginary line connecting the rotation shaft 120 and the third connection point C.

The seat of the present disclosure may sequentially implement the default position, the relax position, and the stow position through the connection arrangement of the frames and links. Only a small number of links are required to implement all these modes, so the system is relatively simple and light in weight. In addition, it has the advantage of requiring little force to implement and taking up very little space when stowed.

FIGS. 7 and 8 are views illustrating the elastic mechanisms S1, S2 of a vehicle seat according to an embodiment of the present disclosure. A spring in FIG. 7 is first examined. The elastic mechanism in FIG. 7 is a spiral spring S1. The elastic mechanism S1 is provided between the fixed frame 100 and the rotating link 300 and may apply a rotational force to the rotating link 300 in a direction in which the seat cushion frame 500 is pulled up. In this case, the elastic mechanism S1 may be a spiral spring S1 disposed on the rotation shaft 120 and wound around the rotation shaft 120, and the ends of the elastic mechanism may be springs respectively connected to the fixed frame 100 and the rotating link 300. In this case, the elastic mechanism S1 always applies pressure rearward pressure to the rotating link 300 as illustrated, and a force is always applied in the direction in which the seat back frame 700 is erected consequently. Therefore, it supplements the user's force during the stow position operation of the seat. It also prevents the seat cushion frame 500 from lifting in the default position.

The elastic mechanism in FIG. 8 is a gas spring type. The elastic mechanism S2 may be provided between the fixed frame 100 and the seat back frame 700 and may apply a rotational force in the direction in which the seat back frame 700 is erected upright. In other words, the gas spring S2 in FIG. 8 exerts a force in the direction in which the piston always retracts. Therefore, the elastic mechanism S2 may connect a first point of the fixed frame 100 and a second point of the seat back frame 700 and may apply an elastic force in the direction in which the first point and the second point are brought closer together. In this case, when the seat moves from the relax position to the stow position or moves to the default position, the elastic mechanism supplements the user's force. This is because the piston of the gas spring S2 retracts when the seat moves from the relax position to the stow position or moves to the default position. In contrast, when the seat moves from the default position or stow position to the relax position, the elastic mechanism acts as a resistance, causing the user to exert more force. This allows the user to experience different movement sensations in each stage, contributing to stable implementation of positions.

According to the vehicle seat of the present disclosure, various modes may be implemented in a relatively simple configuration. The seat is very lightweight and applicable to diverse vehicle models and allows the implementation of various modes with just one lever.

Specific embodiments of the present disclosure are illustrated and described. However, it will be obvious to those skilled in the art the art that the present disclosure may be improved upon and modified in various manners within the scope not deviating from the technical ideas of the present disclosure provided in the following patent claims.

What is claimed is:

1. A vehicle seat, comprising:

a fixed frame disposed in a vehicle body;

a rotating link connected to the fixed frame through a rotation shaft, the rotating link being configured to rotate relative to the rotation shaft;

a seat cushion frame having one side of a rear end portion hinge-connected to the rotating link at a first connection point to rotate the rotating link when the seat cushion frame rotates; and a seat back frame having one side of a lower end portion hinge-connected to the fixed frame at a second connection point and another side of the lower end portion hinge-connected to another side of the rear end portion of the seat cushion frame at a third connection point to rotate relative to the fixed frame when the seat cushion frame is rotated, wherein a recliner is disposed on a rotation shaft, and wherein the recliner has one side connected to the fixed frame and another side connected to the rotating link.

2. The vehicle seat of claim 1, wherein the rotation shaft of the fixed frame is disposed at a front portion of the fixed frame, and an upper portion of the fixed frame is hinge-connected to the seat back frame.

3. The vehicle seat of claim 1, wherein the recliner has a lever, and wherein the rotating link is configured to rotate or restrict rotation of the rotating link by movement of the lever.

4. The vehicle seat of claim 1, wherein the seat cushion frame has a lower portion of the rear end portion hinge-connected to the rotating link and an upper portion of the rear end portion hinge-connected to the seat back frame.

5. The vehicle seat of claim 1, wherein an elastic mechanism is disposed between the fixed frame and the rotating link, and wherein the elastic mechanism is configured to apply a rotational force to the rotating link in a direction in which the seat cushion frame is erected upright.

6. The vehicle seat of claim 5, wherein the elastic mechanism is a spring disposed on the rotation shaft, the elastic mechanism having one end connected to the fixed frame and another end connected to the rotating link.

7. The vehicle seat of claim 1, wherein an elastic mechanism is disposed between the fixed frame and the seat back frame, and wherein the elastic mechanism is configured to apply a rotational force in a direction in which the seat back frame is erected upright.

8. The vehicle seat of claim 7, wherein the elastic mechanism connects a first point of the fixed frame and a second point of the seat back frame, the elastic mechanism being configured to apply an elastic force in a direction in which the first point and the second point are brought closer together.

9. The vehicle seat of claim 1, wherein the seat back frame is configured to be upright to form a default position of the vehicle seat when the seat cushion frame is lowered forward, the seat back frame is configured to rotate to a diagonal position between rearward and upward directions to form a relax position when the seat cushion frame is rotated to another diagonal position between a forward direction and the upward direction, and the seat back frame is configured to be erected upright to form a stow position when the seat cushion frame is pulled upright.

10. The vehicle seat of claim 9, wherein the first connection point is configured to be positioned behind the rotation shaft in the default position.

11. The vehicle seat of claim 9, wherein the first connection point is configured to be positioned behind an imaginary line connecting the rotation shaft and the second connection point and an imaginary line connecting the rotation shaft and the third connection point in the default position of the vehicle seat.

12. The vehicle seat of claim 9, wherein the first connection point is configured to be positioned above the rotation shaft in the relax position.

13. The vehicle seat of claim 9, wherein the first connection point is configured to be positioned between an imaginary line connecting the rotation shaft and the second connection point and an imaginary line connecting the rotation shaft and the third connection point in the relax position.

14. The vehicle seat of claim 9, wherein the first connection point is configured to be positioned in front of the rotation shaft in the stow position.

15. The vehicle seat of claim 9, wherein the first connection point is configured to be positioned in front of an imaginary line connecting the rotation shaft and the second connection point and an imaginary line connecting the rotation shaft and the third connection point in the stow position.

16. A vehicle seat, comprising:

a fixed frame disposed in a vehicle body;

a rotating link connected to the fixed frame through a rotation shaft, the rotating link being configured to rotate relative to the rotation shaft;

a seat cushion frame having one side of a rear end portion hinge-connected to the rotating link at a first connection point to rotate the rotating link when the seat cushion frame rotates; and a seat back frame having one side of a lower end portion hinge-connected to the fixed frame at a second connection point and another side of the lower end portion hinge-connected to another side of the rear end portion of the seat cushion frame at a third connection point to rotate relative to the fixed frame when the seat cushion frame is rotated, wherein an elastic mechanism is disposed between the fixed frame and the rotating link, wherein the elastic mechanism is configured to apply a rotational force to the rotating link in a direction in which the seat cushion frame is erected upright.

17. A vehicle seat, comprising:

a fixed frame disposed in a vehicle body;

a rotating link connected to the fixed frame through a rotation shaft, the rotating link being configured to rotate relative to the rotation shaft;

a seat cushion frame having one side of a rear end portion hinge-connected to the rotating link at a first connection point to rotate the rotating link when the seat cushion frame rotates; and a seat back frame having one side of a lower end portion hinge-connected to the fixed frame at a second connection point and another side of the lower end portion hinge-connected to another side of the rear end portion of the seat cushion frame at a third connection point to rotate relative to the fixed frame when the seat cushion frame is rotated, wherein the seat back frame is configured to be upright to form a default position of the vehicle seat when the seat cushion frame is lowered forward, wherein the seat back frame is configured to rotate to a diagonal position between rearward and upward directions to form a relax position when the seat cushion frame is rotated to another diagonal position between a forward direction and the upward direction, and wherein the seat back frame is configured to be erected upright to form a stow position when the seat cushion frame is pulled upright.

* * * * *